April 16, 1957 F. H. GREEN 2,788,647
GASEOUS FLUID COOLING DEVICE
Filed Nov. 14, 1949 2 Sheets-Sheet 1

INVENTOR.
FREDERICK H. GREEN
BY
ATTORNEY

April 16, 1957      F. H. GREEN      2,788,647

GASEOUS FLUID COOLING DEVICE

Filed Nov. 14, 1949      2 Sheets-Sheet 2

INVENTOR.
FREDERICK H. GREEN
BY
ATTORNEY

United States Patent Office 2,788,647
Patented Apr. 16, 1957

2,788,647

GASEOUS FLUID COOLING DEVICE

Frederick H. Green, Los Angeles, Calif., assignor to The Garrett Corporation, Los Angeles, Calif., a corporation of California Application November 14, 1949, Serial No. 127,127

18 Claims. (Cl. 62—136)

My invention relates to the cooling of gaseous fluids, and relates in particular to a simple device for cooling an air stream. Although the invention may be used advantageously under various conditions, it is of particular utility in aircraft including projectiles, missiles or the like, where cooled air is required.

It is an object of the invention to provide a device having vortex tube cooling means combined in a compact unit with a heat exchanger for cooling a stream of compressed gaseous medium which is subsequently to be cooled in the vortex tube. It will be understood, therefore, that the preferred embodiment disclosed herein with relation to the cooling of air, may be also used for cooling of other gaseous or vaporous fluids.

A further object of the invention is to provide a device having a vortex tube air cooling means, wherein hot air discharged from the vortex tube is employed to operate a means for cooling the flow of air which is subsequently to be cooled by the vortex tube.

A further object of the invention is to provide a device of the character described in the foregoing paragraph having an aspirator, actuated by air discharged from the hot air outlet of the vortex tube, for moving coolant air through a heat exchanger forming part of the device.

A further object of the invention is to provide a cooling device of the character described herein having a simple means for increasing the efficiency of operation of the device by cooling the heated portions of the vortex tube. This cooling of the vortex tube accomplishes a reduction in the temperature of the air delivered by the cold air outlet of the vortex tube below that which is obtained when no cooling is used.

A further object of the invention is to provide a cooling device which has no moving parts and is therefore quite dependable.

Further objects and advantages of the invention will be brought out in the following part of the specification wherein I have in detail described the preferred embodiment of the invention for the purpose of making a complete disclosure, without limiting the scope of the invention defined in the appended claims.

Referring to the drawings which are for illustrative purposes only:

Figure 1:
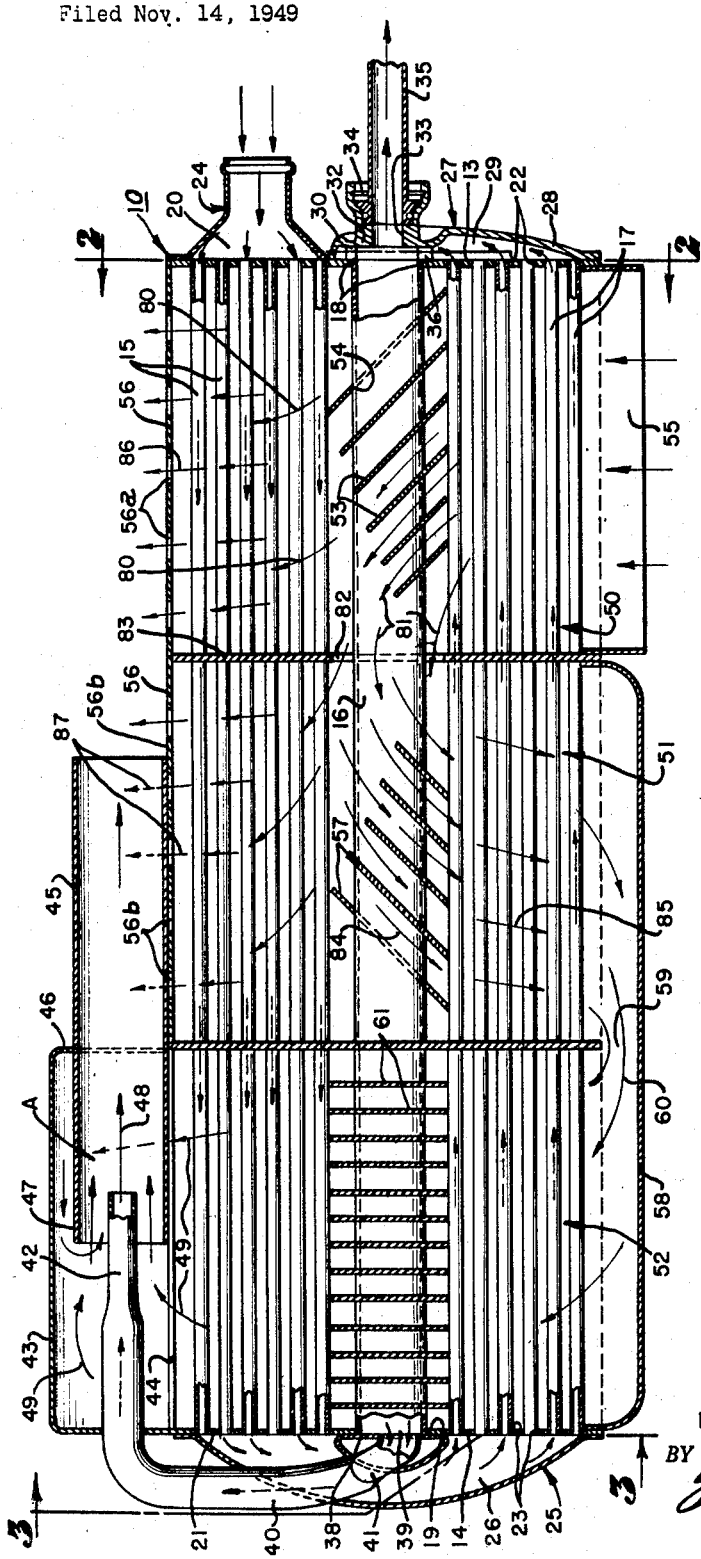
Fig. 1 is a longitudinal section through a device taken as indicated by the line 1—1 of Fig. 2.

The device includes a casing 10 of generally rectangular form having side walls 11 and 12 of rectangular outline. There is also a front end wall 13 and a rear end wall 14, which walls 13 and 14 comprise plates for supporting heat exchanger tubes 15 and 17 and vortex tubes 16.

The tubes 15 and 17 are of metal and are of relatively small diameter, as employed in heat exchangers. There are two of the vortex tubes 16 which are of relatively large diameter, as compared to the tubes 15 and 17, and comprise the tube parts of vortex cooler means operating in accordance with the general principles taught in U. S. Patent No. 1,952,281, granted March 27, 1934, to G. J. Ranque for Method and Apparatus for Obtaining From a Fluid Under Pressure Two Currents of Fluids at Different Temperatures. The front wall or plate 13 has a pair of openings 18 to receive and support the vortex tubes 16. These openings 18 are disposed in side-by-side relation, between the side walls 11 and 12, and positioned intermediately of the upper and lower ends of the wall 13. The rear end plate or wall 14 has similar openings 19 for support of the rear ends of the tubes 16.

The heat exchanger tubes 15 are disposed within the casing 10 above the tubes 16, and the ends thereof are seated in openings 20 and 21 in the end walls 13 and 14. The heat exchanger tubes 17 are disposed in parallel relation to the tubes 15 and 16 and occupy the space within the casing 10 below the tubes 16. The lower portions of the end walls 13 and 14 have openings 22 and 23 therein to receive the ends of the tubes 17. A compressed hot air inlet fitting 24 is secured to the upper portion of the front end wall 13, to communicate with the front ends of the tubes 15, whereby compressed air, which enters the inlet 24 may pass rearwardly or leftwardly from the fitting 24 through the tubes 15. At the rear end of the casing 10 is an intercommunicating duct member 25 which is secured to the outer face of the rear end wall 14 and provides a passage 26 connecting the leftward ends of the tubes 15 with the leftward ends of the tubes 17.

An air induction fitting 27 for the two vortex tubes 16 is secured to the outer face of that portion of the wall 13 below the compressed air inlet 24. This air induction fitting has a wall 28 defining a space 29 which communicates with the rightward ends of the tubes 17. The fitting 27 also has annular walls 30 at the front ends of the tubes 16 and arranged coaxially with the tubes 16. The inner surfaces 31 of the walls 30 are cylindrical and are of the same diameter as the internal surfaces of the tubes 16. The fitting 27 also includes walls 32 which have air outlet openings 33 for the vortex cooling devices, these openings 33 being coaxial with the tubes 16 and of smaller diameter than the tubes 16. The walls 32 carry means 34 for securing and for connecting to the openings 33 pipes 35 by which the cold air is conducted to the desired place of utilization, for example, a compartment having control equipment or a cabin for occupants of the aircraft. The annular walls 30 of the air induction fitting 27 have therein slots 36 defining inwardly directed air inlet nozzles for the rightward ends of the vortex tubes 16.

In the operation of the vortex tubes 16, the partly cooled compressed air passes from the interior of the air induction fitting through nozzles or passages 36 into the rightward ends of the tubes 16 at high velocity and rotates around the axes of the tubes at high velocity. This air travels rearwardly or leftwardly along the wall of the tube and the action of the rotating or swirling movement of the air results in a concentration of heat in the air adjacent the wall of the tube and a reduction in the heat content of the air which is nearer to the axis of the tube. The wall of the tube transfers this heat directly to the coolant air and also to the fins which in turn conduct the heat to coolant air passing between them as will be hereinafter described, the heat dissipation which results from the cooling of the tube wall in the manner described resulting in a marked increase in the efficiency of the vortex.

The fitting 25, at the leftward end of the casing 10, has also a wall 38 which extends over the leftward ends of the tubes 16, this wall 38 having openings 39 which communicate with the rear or leftward ends of the vortex tubes 16.

Figure 2:
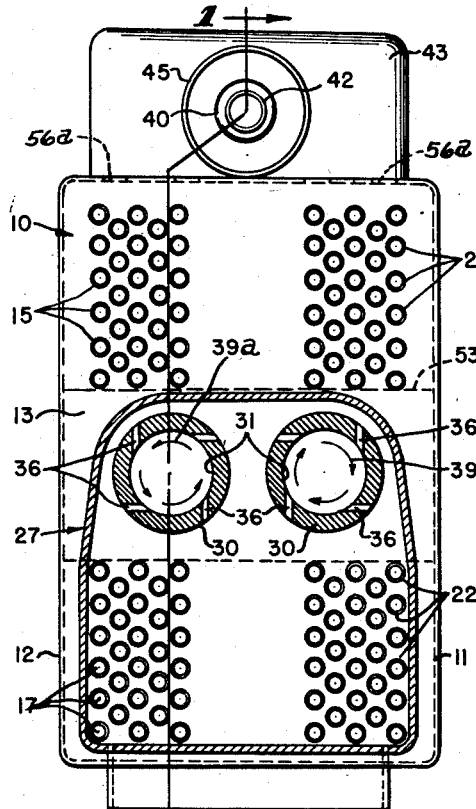
Fig. 2 is a cross-sectional view taken as indicated by the line 2—2 of Fig. 1.
Figure 3:
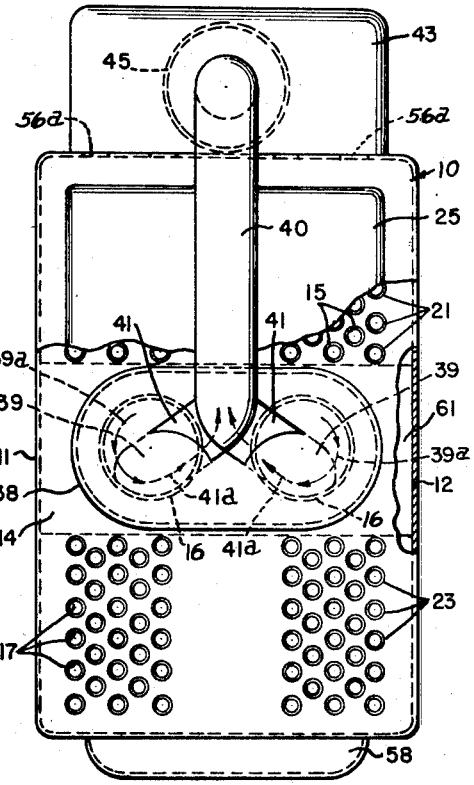
Fig. 3 is a sectional view taken as indicated by the line 3—3 of Fig. 1.

The openings 39 are connected by branch pipes 41 with a pipe 40 which leads to an aspirator nozzle 42 of reduced diameter so that it will hold a back pressure on the outlet or heated air ends of the tubes 16. The orifice of the nozzle 42 is of such size with relation to the cooled air outlets 33 that predetermined flows of cooled and heated air through the openings 33 and 39 will be obtained. As shown in Figs. 1 and 3, the outlet openings 39 are disposed eccentrically of the axis of the tubes 16, and the branch pipes 41 are disposed diagonally or helically with relation to the axes of the tubes 16. The pipes 41, therefore, constitute continuations of the helical paths of flow of air in the tubes 16. Arrows 39a in Figs. 2 and 3 indicate the circular flow of air within the tube 16, and in Fig. 3, arrows 41a indicate the manner in which the swirling or circular flows of air within the rear ends of the tubes 16, as indicated by arrows 39a in Fig. 3, continue into the pipes 41 with greatly reduced swirling action and with decreased turbulence. Here, the purpose is to approach rectilinear conditions in the flows of air through the pipes 41 into the pipe 40, instead of swirling flows, so that the air which reaches the aspirator nozzle 42 will have minimum turbulence or swirl.

The aspirator or ejector nozzle 42 extends into a dome 43 mounted on the top of the casing 10 at the rear end thereof, this dome 43 communicating with the interior of the casing 10 through an opening 44. The aspirator includes an outlet pipe 45 which projects into the dome 43 through the front wall 46 thereof and has its inner end 47 in telescoping or overlapping relation to the nozzle 42, so that air issuing from the nozzle 42, as indicated by arrow 48, will produce a suction within the air outlet pipe 45 and draw coolant air from section 52 of the interior of the casing 10, as indicated by arrows 49.

The interior of the casing 10 is divided into three sections 50, 51 and 52 and the tubes 15, 16 and 17 extend through these sections, in section 50, heat dissipating fins 53 are disposed on the rightward portions of the tubes 16. These fins 53 consist of thin rectangular metal plates of a length to extend from the side wall 11 to the side wall 12 and having eliptical openings through which the portions of the tubes 16 extend. The fins 53 are disposed diagonally, are gradually reduced in width from right to left, as shown in Fig. 1, and are joined with the metal walls of the tubes 16 by fused metal so that heat from the wall 16 of the tubes will be readily carried out into the fins. In section 51 diagonal fins 57 are disposed on the tube 16. These fins 57 are rectangular in outline and are similar to the fins 53, except that they are disposed in opposite angular relation upon the tube 16 and are reduced in width from left to right. A dished wall 58 is secured on the bottom of the casing 10 so as to extend over the lower ends of the sections 51 and 52 and so to provide a communicating passage 59 between the lower ends of these sections, through which the coolant air may pass as indicated by arrow 60. On the portions of the tubes 16 extending through section 52, fins 61 are secured, these fins being in parallel planes normal to the axis of the tubes. Fins 61 are rectangular in outline and extend from one side wall 11 to the other side wall 12. The upper ends of sections 50 and 51 are covered by walls 56 having therein air outlet openings 56a and 56b which are distributed throughout the areas of the walls 56.

In the bottom of casing 10, communicating with the lower part of section 50, there is a coolant air inlet 55. This coolant air inlet 55 is disposed diagonally across the casing 10 from the coolant outlet opening 44. The coolant air, which enters the inlet opening 55, passes upwardly between the portions of the tubes 17 in the lower part of section 50. The coolant air then passes upwardly so as to move in crossing relation to the vortex tubes 16. A large portion of this air passes between the fins 53 and is directed laterally. As indicated by arrows 80, Fig. 1, a portion of the air passes upwardly between the parts of the tubes 15 in the upper part of section 50, and as indicated by arrows 81 a portion of the air passes through an opening 82 in the partition wall 83 between sections 50 and 51, into section 51. The flow of air which enters section 51 is divided, a portion thereof passing upwardly as indicated by arrows 87 and a portion thereof passing through the spaces between the fins 57 as indicated by arrows 84 and downwardly as indicated by arrows 85. As indicated by arrows 60, air passes from the lower part of section 51 into lower part of section 52. Suction produced by air which flows from the aspirator nozzle 42, draws air upwardly between the portions of the tubes 17, 16 and 15 which extend in the section 52.

The openings 56a and 56b in the walls 56, disposed at the upper ends of the sections 50 and 51, have the function of controlling or limiting the flow of air from the upper portions of the sections 50 and 51 as indicated by arrows 86 and 87. In the form of the invention shown, 25% of the air originally entering the opening 55 passes through the air outlet openings 56a and the remaining 75% of the original air passes through the opening 82 in the partition wall 83 into the middle section 51. Herein there is a division of the air, as previously explained. The openings 56b are of such size that 25% of the original air, which has entered the inlet opening 55, passes out therethrough, and the remaining 50% of the original air passes downwardly as indicated by arrows 85 in section 51 and is conducted into the lower part of section 52. It will be understood that when the aircraft is in flight, coolant air will be conducted to the coolant air inlet 55 from a ram duct of the aircraft. This air will be under compression and will be distributed substantially as described in the foregoing. However, when the aircraft is standing on the ground, there will be no feeding of ram-duct air to the inlet 55, and the circulation of coolant air through the device will be obtained entirely by the action of the aspirator A. The amount of coolant air circulated under these conditions will be small as compared to the amount of air circulated when the aircraft is traveling at high velocity. The coolant air, however, will be received at lower temperature and accordingly the amount required for the desired cooling effect will not be as great as compared to the amount of air required under high speed flight conditions.

Figure 4:
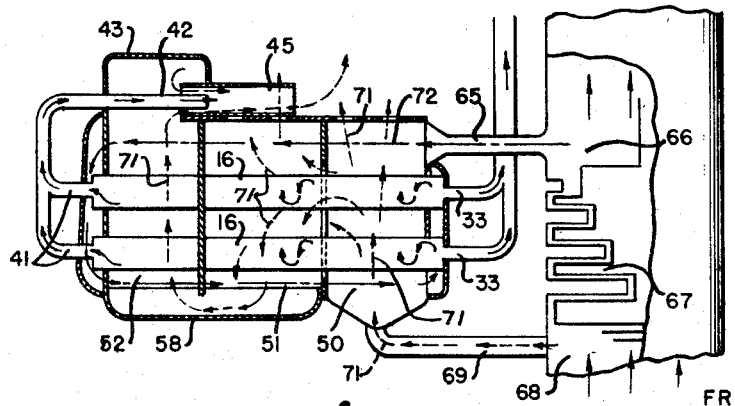
Fig. 4 is a schematic view showing my improved cooling system which employs therein the device shown in the preceding figures.

In Fig. 4, I show the system, forming part of the present invention, for cooling air in an aircraft having air compressing means and having a supply of coolant air obtained from a ram duct. The air cooling system, as employed in a jet driven craft, includes a compressed air duct 65 which bleeds off compressed air from the outlet 66 or an interstage bleed of a jet compressor 67. Coolant air is taken from the ram 68 associated with the jet compressor 67 through piping 69. According to the present invention the compressed air from duct 65 is first passed in heat exchange relation to ram air from duct 69. As indicated by dash lines 71, the coolant air passes through the sections 50, 51 and 52 of the casing 10 and is brought in heat exchange relation to the compressed air which, as indicated by phantom lines 72, passes through the tubes 15 and 17 and then into the rightward ends of the vortex tubes 16 wherein the compressed and partially cooled air is subjected to vortex cooling action, the cold air passing out through the outlets 33, and the hot air passing from the tubes 16 through the pipe parts 41. The action of the jet pump formed by parts 42 and 45 assists in the circulation of coolant air through the device when the aircraft is in flight, and effects circulation of coolant air through the device when the aircraft is on the ground.

I claim:

1. In a system for cooling air which is delivered to a space to be cooled from an air compressor of an aircraft which also has an air ram: a casing having therein a coolant passage for coolant air received from said ram; heat exchange duct means extending in said path of flow of coolant air, the upstream end of said duct means being arranged to receive compressed air from said air compressor; one or more vortex tube means extended in said casing in crossing relation to said path of flow of coolant air, said vortex means having plates thereon in said path of flow to form heat dissipating fins, some of said plates being disposed angularly with relation to said path of flow; an air induction means at one end of said casing adapted to conduct cooled compressed air from the outlet end of said heat exchange duct means to the interiors of said vortex tubes, said air induction means having inlet nozzle means through which the compressed air is delivered into said vortex tubes; cooled air outlet means for said vortex tubes; heated air outlet means for said vortex tubes; an aspirator connected to said casing so as to move air through said coolant passage, said aspirator having a nozzle; and means connecting said heated air outlet means of said vortex tubes to said nozzle of said aspirator so that the discharged hot air will act to move coolant air through said coolant passage.

2. In a system for cooling air which is delivered to a space to be cooled from an air compressor of an aircraft which also has an air ram: a casing having therein a coolant passage for coolant air received from said ram and a wall having outlet openings for a portion of the coolant air; heat exchange duct means extending in said path of flow of coolant air, the upstream end of said duct means being arranged to receive compressed air from said air compressor; a vortex tube positioned in said casing so as to be exposed to coolant air; an air induction means adapted to conduct cooled compressed air from the outlet end of said heat exchange duct means to the interior of said vortex tube, said air induction means having at least one opening through which the compressed air is delivered into said vortex tube; cooled air outlet means for said vortex tube; heated air outlet means for said vortex tube; an aspirator connected to said casing so as to move air through at least a portion of said coolant passage; and means connecting said heated air outlet means of said vortex tube to said aspirator so that the discharged heated air will act to move coolant air in said coolant passage.

3. In a system for cooling air which is delivered to a space to be cooled from an air compressor of an aircraft which also has an air ram: a casing having therein a coolant passage for coolant air received from said ram; heat exchange duct means extending in said path of flow of coolant air, the forward end of said duct means being arranged to receive compressed air from said air compressor; a vortex tube extended in said casing in crossing relation to said path of flow of coolant air; an air induction means at one end of said casing adapted to conduct cooled compressed air from the outlet end of said heat exchange duct means to the interior of said vortex tube, said air induction means having at least one opening through which the compressed air is delivered into said vortex tubes; cooled air outlet means for said vortex tubes; heated air outlet means for said vortex tubes; and means actuated by the heated air discharged from said heated air outlet means and being adapted to move coolant air in said coolant passage.

4. In a system for cooling a compressed gaseous fluid derived from a source of gaseous fluid under pressure: heat exchange means for passing the compressed gaseous fluid in heat exchange relation to a coolant to reduce the temperature of the fluid; a vortex member extending in said heat exchange means at a location spaced from the coolant inlet of said heat exchange means, said vortex member having a compressed fluid inlet, a cooled fluid outlet and a heated fluid outlet; and means forming a duct to deliver cooled gaseous fluid from said heat exchange means to said fluid inlet of said vortex member.

5. In a system for cooling a compressed gaseous fluid derived from a source of gaseous fluid under pressure: heat exchange means for passing the compressed gaseous fluid in heat exchange relation to a coolant to reduce the temperature of the fluid; a vortex member having a compressed fluid inlet, a cooled fluid outlet and a heated fluid outlet; means forming a duct to deliver cooled gaseous fluid from said heat exchange means to said fluid inlet of said vortex member; and means for bringing a coolant into heat exchange relation to said vortex member to extract heat during the operation of said vortex member.

6. In a system for cooling a compressed gaseous fluid derived from a source of gaseous fluid under pressure; heat exchange means for passing the compressed gaseous fluid in heat exchange relation to a coolant to reduce the temperature of the fluid; a vortex member having a compressed fluid inlet, a cooled fluid outlet and a heated fluid outlet, said vortex member comprising a cylindrical wall of heat conductive material and heat dissipating fins projecting from said wall; means forming a duct to deliver cooled gaseous fluid from said heat exchange means to said fluid inlet of said vortex member; and means for bringing a coolant into heat exchange relation to said cylindrical wall and said fins to extract heat during the operation of said vortex member.

7. In a system for cooling a compressed gaseous fluid derived from a source of gaseous fluid under pressure: heat exchange means for passing the compressed gaseous fluid in heat exchange relation to a coolant to reduce the temperature of the fluid; a vortex member having a compressed fluid inlet, a cooled fluid outlet and a heated fluid outlet; means forming a duct to deliver cooled gaseous fluid from said heat exchange means to said fluid inlet of said vortex member; and means actuated by hot fluid from said heated fluid outlet of said vortex member and being arranged to move coolant in said heat exchange means.

8. In a system for cooling a compressed gaseous fluid derived from a source of gaseous fluid under pressure: heat exchange means for passing the compressed gaseous fluid in heat exchange relation to a coolant to reduce the temperature of the fluid; a vortex member having a compressed fluid inlet, a cooled fluid outlet and a heated fluid outlet; means forming a duct to deliver cooled gaseous fluid from said heat exchange means to said fluid inlet of said vortex member; means acting to bring coolant into heat exchange relation to said vortex member to extract heat during the operation of said vortex member; and means actuated by heated fluid from said hot fluid outlet of said vortex member and being arranged to move at least a part of said coolant.

9. In a system for cooling a compressed gaseous fluid derived from a source of gaseous fluid under pressure; heat exchange means for passing the compressed gaseous fluid in heat exchange relation to a coolant to reduce the temperature of the fluid; a vortex member having a compressed fluid inlet, a cooled fluid outlet and a heated fluid outlet, said vortex member comprising an outer wall of heat conductive material and heat dissipating fins projecting from said wall; means forming a duct to deliver cooled gaseous fluid from said heat exchange means to said fluid inlet of said vortex member; means for bringing a coolant into heat exchange relation to said wall and said fins to extract heat during the operation of said vortex member; and means actuated by heated fluid from said hot fluid outlet of said vortex member and being arranged to move coolant in said heat exchange means.

10. In a system for cooling a compressed gaseous fluid derived from a source of gaseous fluid under pressure: a vortex member having a compressed fluid inlet, a cooled fluid outlet and a heated fluid outlet; and means forming a duct to deliver compressed gaseous fluid from said source to said fluid inlet of said vortex member; and means adapted to guide a coolant in heat exchange relation to said vortex member to carry off heat from said vortex member during its operation.

11. In a system for cooling a compressed gaseous fluid derived from a source of gaseous fluid under pressure: a vortex member having a compressed fluid inlet, a cooled fluid outlet and a heated fluid outlet; means forming a duct to deliver compressed gaseous fluid from said source to said fluid inlet of said vortex member; means adapted to guide a coolant in heat exchange relation to said vortex member to carry off heat from said vortex member during its operation; and a heated gaseous fluid outlet duct member connected eccentrically to said vortex member.

12. In a system for cooling a compressed gaseous fluid derived from a source of gaseous fluid under pressure: a vortex member having a compressed fluid inlet, a cooled fluid outlet and a heated fluid outlet; means forming a duct to deliver compressed gaseous fluid from said source to said fluid inlet of said vortex member; and a heated gaseous fluid outlet duct member connected eccentrically to said vortex member.

13. In a cooling device for gaseous fluid which is delivered from a source of gaseous fluid under pressure to a space: a casing having therein a coolant passage and means for connecting said coolant passage to a supply of coolant, said coolant passage following a zig-zag path within said casing; heat exchange tube means extending across said path of flow of coolant in said casing, the forward end of said tube means being arranged to receive gaseous fluid from said source of gaseous fluid under pressure; a pair of vortex tubes extended in said casing in crossing relation to said path, said vortex tubes having plates thereon in said path of flow to form heat dissipating fins, some of said plates being disposed angularly with relation to said path of flow; gaseous fluid induction means at one end of said casing adapted to conduct cooled compressed gaseous fluid from the outlet end of said heat exchange tube means to the interiors of said vortex tubes, said induction means having tangential nozzles through which the compressed gaseous fluid is delivered into said vortex tubes; cooled gaseous fluid outlet means for said vortex tubes; heated gaseous fluid outlet means for said vortex tubes; an aspirator connected to said casing so as to move coolant through said coolant passage, said aspirator having a nozzle; and means connecting said heated gaseous fluid outlet means of said vortex tubes to said nozzle of said aspirator so that the discharged hot gaseous fluid will act to move coolant through said coolant passage.

14. In a cooling device for gaseous fluid which is delivered from a source of gaseous fluid under pressure to a space: a casing having therein a coolant passage and means for connecting said coolant passage to a supply of coolant; heat exchange tube means extending through said path of flow of coolant in said casnig, the forward end of said tube means being arranged to receive gaseous fluid from said source of gaseous fluid under pressure; a vortex tube positioned in said casing so as to be exposed to coolant air, said vortex tube having plates thereon in said path of flow to form heat dissipating fins, some of said plates being disposed angularly with relation to said path of flow; gaseous fluid induction means at one end of said casing adapted to conduct cooled compressed gaseous fluid from the outlet end of said heat exchange tube means to the interior of said vortex tube, said induction means having at least one opening through which the gaseous fluid is delivered into said vortex tube; cooled gaseous fluid outlet means for said vortex tube; a heated gaseous fluid outlet means for said vortex tube; an aspirator connected to said casing so as to move coolant through said coolant passage; and means connecting said heated gaseous fluid outlet means of said vortex tube to said aspirator so that the discharged heated gaseous fluid will act to move coolant through said coolant passage.

15. In a cooling device for gaseous fluid which is delivered from a source of gaseous fluid under pressure to a space: a casing having therein a coolant passage and means for connecting said coolant passage to a supply of coolant; heat exchange tube means extending in said path of flow of said casing, the forward end of said tube means being arranged to receive gaseous fluid from said source of gaseous fluid under pressure; a pair of vortex tubes extended in said casing in crossing relation to said path of flow of coolant air; gaseous fluid induction means at one end of said casing adapted to conduct cooled compressed gaseous fluid from the outlet end of said heat exchange tube means to the interiors of said vortex tubes, said induction means having at least one opening through which the gaseous fluid is delivered into said vortex tubes; cooled gaseous fluid outlet means for said vortex tubes; heated gaseous fluid outlet means for said vortex tubes; and means actuated by the heated gaseous fluid discharged from said gaseous fluid outlet and operating to move coolant through said coolant passage.

16. In a system for cooling a compressed gaseous fluid derived from a source of gaseous fluid under pressure: a vortex member having a compressed fluid inlet and cooled fluid outlet; means forming a duct to deliver compressed gaseous fluid from said source to said fluid inlet of said vortex member; and means adapted to guide a coolant in heat exchange relation to said vortex member to carry off heat from said vortex member during its operation.

17. In a vortex tube cooling device for a gaseous substance: a plurality of tubular walls arranged in side-by-side relation; a transverse plate having in side-by-side relation openings to receive said tubular walls; outlet tubes of smaller diameter than said tubular walls extending from the ends of said tubular walls; and inlet nozzle means for the gaseous substance to be cooled disposed between the end portions of said tubular walls and said outlet tubes.

18. In a vortex tube cooling device for a gaseous substance: a plurality of tubular walls arranged in side-by-side relation; a transverse plate having in side-by-side relation openings to receive said tubular walls; outlet tubes of smaller diameter than said tubular walls extending from the ends of said tubular walls; inlet nozzle means for the gaseous substance to be cooled disposed between the end portions of said tubular walls and said outlet tube; and wall means cooperating with said transverse plate to form an inlet chamber for the gaseous substance communicating with said nozzle means.

References Cited in the file of this patent

UNITED STATES PATENTS

| | | |
|---|---|---|
| 1,812,339 | Horne | June 30, 1931 |
| 1,952,281 | Rangue | Mar. 27, 1934 |
| 2,097,104 | Saha | Oct. 26, 1937 |